United States Patent [19]

Haddad et al.

[11] Patent Number: 4,778,660
[45] Date of Patent: Oct. 18, 1988

[54] APPARATUS FOR SEPARATING CATALYSTS IN FCC CLOSED CYCLONE SYSTEM

[75] Inventors: James H. Haddad, Princeton Junction; Hartley Owen, Belle Mead, both of N.J.

[73] Assignee: Mobil Oil Corporation, New York, N.Y.

[21] Appl. No.: 868,476

[22] Filed: May 30, 1986

Related U.S. Application Data

[62] Division of Ser. No. 667,519, Nov. 1, 1984, Pat. No. 4,606,814.

[51] Int. Cl.[4] .............................................. B01J 8/18
[52] U.S. Cl. .................................. 422/144; 422/145; 422/147; 422/214
[58] Field of Search ............... 422/144, 145, 146, 147, 422/214

[56] References Cited

U.S. PATENT DOCUMENTS

| | | | |
|---|---|---|---|
| 2,310,377 | 2/1943 | Voorhees | 196/52 |
| 2,328,325 | 8/1943 | Butikofer | 196/52 |
| 2,463,434 | 3/1949 | Shankland | 196/52 |
| 3,799,868 | 3/1974 | Gantt | 208/153 |
| 3,838,036 | 9/1974 | Stine et al. | 208/120 |
| 3,841,843 | 10/1974 | Williams et al. | 422/144 |
| 3,952,022 | 4/1976 | Becuwe | 422/145 |
| 4,043,899 | 8/1977 | Anderson et al. | 208/161 |
| 4,070,159 | 1/1978 | Myers et al. | 208/161 |
| 4,206,174 | 6/1980 | Heffley et al. | 422/147 |
| 4,289,729 | 9/1981 | Myers et al. | 422/144 |
| 4,295,961 | 10/1981 | Fahrig et al. | 208/161 |
| 4,310,489 | 1/1982 | Fahrig et al. | 208/161 |
| 4,331,533 | 5/1982 | Dean | 422/144 |
| 4,394,349 | 7/1983 | Cartmell | 208/161 |
| 4,397,738 | 8/1983 | Kemp | 422/144 |
| 4,404,095 | 9/1983 | Haddad et al. | 208/161 |
| 4,478,708 | 10/1984 | Farnsworth | 208/161 |
| 4,502,947 | 3/1985 | Haddad et al. | 208/161 |
| 4,588,558 | 5/1986 | Kam et al. | 422/147 |

FOREIGN PATENT DOCUMENTS 542646 10/1983 Australia .

*Primary Examiner*—Peter Kratz
*Attorney, Agent, or Firm*—Alexander J. McKillop; Michael G. Gilman; Malcolm D. Keen

[57] ABSTRACT

A method and apparatus for improving the separation of a catalyst phase from a gas suspension phase in a fluidized catalytic cracking (FCC) unit. In a vertical separation embodiment, a cyclone separator inlet is located in the upper portion of a riser conversion zone and draws off gaseous hydrocarbon materials, while catalyst particles continue vertically to the end of the riser conversion zone, and pass through a catalyst conduit to a catalyst storage area. In a horizontal separation embodiment, the catalyst/hydrocarbon mixture is transported horizontally from the end of the riser conversion zone past a cyclone separator inlet towards a catalyst conduit. The cyclone inlet draws off gaseous hydrocarbon materials, while the catalyst particles pass through the catalyst conduit to a catalyst storage area.

6 Claims, 4 Drawing Sheets

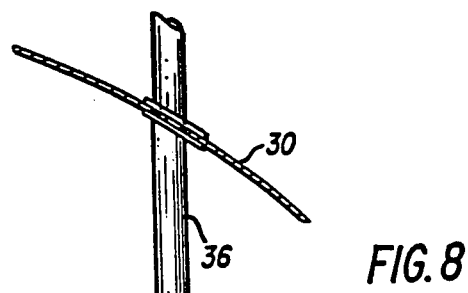
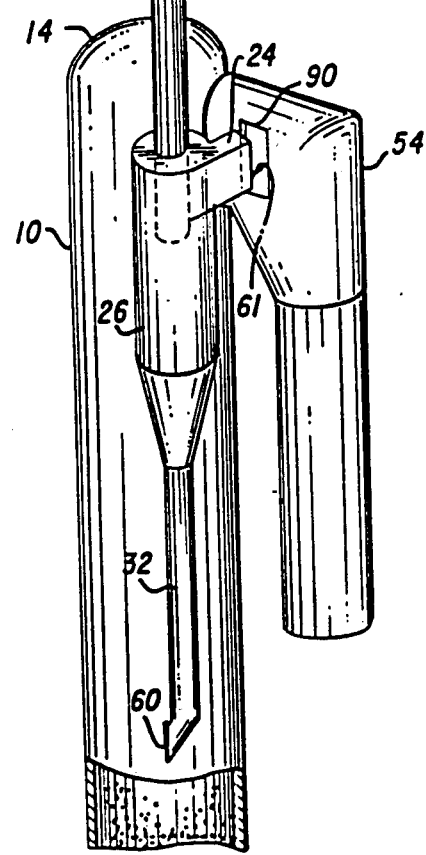
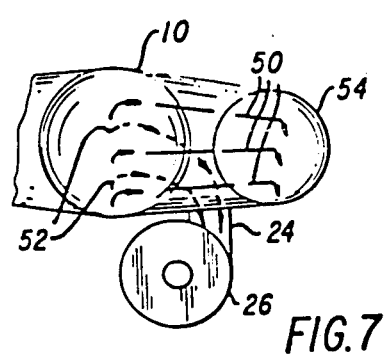
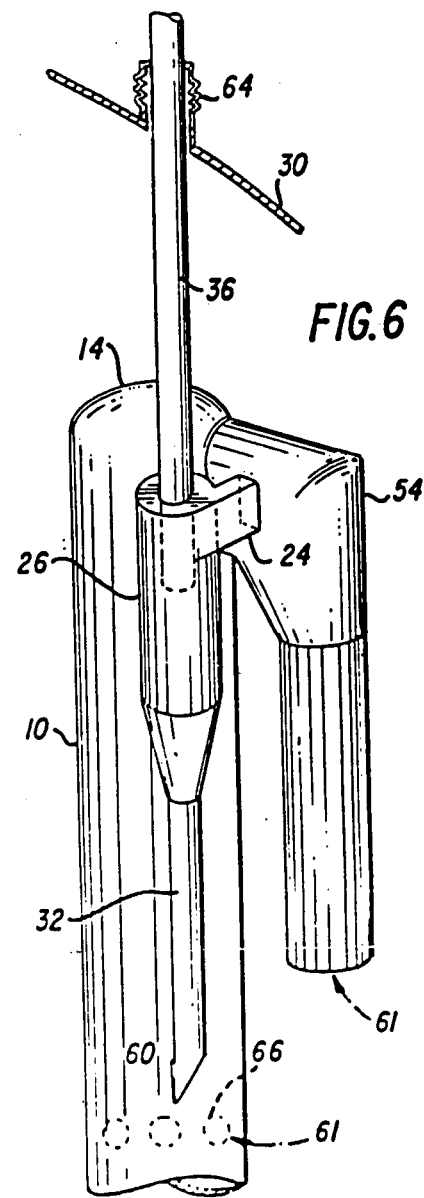

APPARATUS FOR SEPARATING CATALYSTS IN FCC CLOSED CYCLONE SYSTEM

CROSS REFERENCE TO RELATED APPLICATION

This application is a division of application Ser. No. 667,519, filed Nov. 1, 1984, now pending now U.S. Pat. No. 4,606,814.

BACKGROUND OF THE INVENTION

1. Field of the Invention

This invention relates to a method and apparatus for the separation of a catalyst phase from a gas suspension phase in a fluidized catalytic cracking (FCC) unit. More particularly, it relates to an improved method and apparatus for separating the catalyst phase from the gas suspension phase in a closed cyclone process and system, to reduce the cyclone size requirements while maintaining the desired hydrocarbon and catalyst feed flowrate.

2. Discussion of the Prior Art

The field of catalytic cracking, particularly fluid catalytic cracking, has undergone significant development improvements due primarily to advances in catalyst technology and product distribution obtained therefrom. With the advent of high activity catalysts, and particularly crystalline zeolite cracking catalysts, new areas of operating technology have been encountered requiring refinements in processing techniques to take advantage of the high catalyst activity, selectivity and operating sensitivity.

By way of background, the hydrocarbon conversion catalyst usually employed in an FCC installation is preferably a high activity crystalline zeolite catalyst of a fluidizable particle size. The catalyst is transferred in suspended or dispersed phase condition with a hydrocarbon feed generally upwardly through one or more riser conversion zones (FCC cracking zones), providing a hydrocarbon residence time in each conversion zone in the range of 0.5 to about 10 seconds, and usually less than about 8 seconds. High temperature riser hydrocarbon conversions, occuring at temperatures of least 1000° F. or higher and at 0.5 to 4 seconds hydrocarbon residence time in contact with the catalyst in the riser, are desirable for some operations before initiating separation of vaporous hydrocarbon product materials from the catalyst.

Rapid separation of catalyst from hydrocarbons discharged from a riser conversion zone is particularly desirable for restricting hydrocarbon conversion time. During the hydrocarbon conversion step, carbonaceous deposits accumulate on the catalyst particles and the particles entrain hydrocarbon vapors upon removal from the hydrocarbon conversion step. The entrained hydrocarbons are subjected to further contact with the catalyst until they are removed from the catalyst by a separator which could be a mechanical means, and/or stripping gas in a separate catalyst stripping zone. Hydrocarbon conversion products separated and materials stripped from the catalyst are combined and passed to a product fractionation step. Stripped catalyst containing deactivating amounts of carbonaceous material, hereinafter referred to as coke, is then passed to a catalyst regeneration operation.

Cyclonic equipment is typically used for efficient separation of fluidizable catalyst particles from the gas suspension stage. In U.S. patent application Ser. No. 612,277 filed May 21, 1984, entitled "Closed Cyclone FCC Catalyst Separation Method and Apparatus" by J. H. Haddad et al, a cyclone separation system is disclosed which reduces the undesirable extended residence time of product vapor within a large reactor vessel. The reduction in residence time is brought about by connecting a number of cyclone seperators in series directly to the output of the riser conversion zone with the gaseous output of the last cyclone conducting cracked hydrocarbons out of the reactor vessel. While extremely effective, the passage of virtually all of the hydrocarbon feed through the primary cyclone requires that it be designed for a relatively high volume flow of gas products as well as fluidized catalyst particles. This size requirement dictates that the reactor vessel, enclosing the riser conversion zone and separation cyclones, be relatively large.

U.S. Pat. No. 4,404,095 to Haddad et al, discloses an FCC reactor comprising a riser 10 with radially extending sidearms 12 as the first catalyst-hydrocarbon separation means, as seen in FIG. 1 of the present application. The sidearms 12 force the suspension of the catalyst and hydrocarbons to change direction of flow, from the vertical to the horizontal direction, when striking end 14. The catalyst particles fall out of sidearm openings 16 in a downward direction, to a respective stripping means 18 which includes baffles 20. The hydrocarbons, with some entrained catalyst particles, proceed through passages 22 into the inlets 24 of cyclones 26. The sidearms 12 and the secondary separation means are enclosed by a vertical conduit 28 to prevent random uncontrolled thermal cracking of the hydrocarbons, which would ordinarily be present for a substantial period of time in the reactor vessel 30. Catalyst particles separated in cyclones 26 pass through diplegs 32 through to the bottom of the reactor and are removed through conduit 34. Hydrocarbon gases pass through the cyclone exhaust 36 into plenum 38 and out conduit 40 to a fractionation unit (not shown).

It can be seen in FIG. 1 that all of the catalyst particles and gaseous hydrocarbon materials exiting riser 10 must pass through the radially extending sidearms 12, requiring that they be sized to accommodate such a flow. Furthermore, during operation, substantial radial and longitudinal thermal expansion is encountered in the connecting conduits and intakes, and radially extending sidearms which necessitate some thermal accommodation.

SUMMARY OF THE INVENTION

It is an object of the present invention to provide an improved method and apparatus for ensuring that a high percentage of catalyst particles pass into a catalyst conduit, while a high percentage of gasiform hydrocarbon materials pass into the inlet of a cyclone separator.

It is a further object of the present invention to provide an improved method and apparatus for inertially separating catalyst particles from gasiform hydrocarbon materials, thus reducing the size requirements of a cyclone separator to which the gasiform hydrocarbon materials are subsequently passed.

It is an additional object of the present invention to provide a method and apparatus for turning gasiform hydrocarbon materials in a vertical plane, so as to separate them from catalyst particles prior to futther cyclonic separation of remaining catalyst particles in gasiform hydrocarbon materials.

It is a still further object of the present invention to provide a method and apparatus for turning gasiform hydrocarbon materials in a horizontal plane, so as to separate them from catalyst particles prior to a further cyclonic separation of remaining catalyst particles in gasiform hydrocarbon materials.

It is an additional object of the present invention to provide an inertial separator/cyclonic separator combination, which accounts for varied rates of thermal expansion in the riser and the reactor vessel walls.

In its method aspects, the present invention achieves the above and other objects in accordance with the steps of passing a mixture, as a suspension, of hydrocarbon feed and a catalyst to a riser conversion zone contained within a reactor vessel and cracking the hydrocarbon feed in the riser conversion zone; guiding the mixture in a direction adjacent a riser cyclone separator inlet located in the riser conversion zone towards an inlet of a catalyst conduit, where the direction of flow of gasiform hydrocarbon materials into the separator inlet is at an angle with respect to the direction of flow of said mixture prior to reaching the inlet; passing all of the mixture remaining, after passing the inlet, to a catalyst conduit; separating any catalyst remaining in the gasiform materials in the riser cyclone separator and passing the separated catalyst through a cyclone dipleg; passing gaseous hydrocarbon effluent from the riser cyclone separator exhaust to a downstream fractionation apparatus; and passing catalyst from the catalyst conduit and from the cyclone dipleg into a catalyst dense bed in the reactor vessel.

In its apparatus aspects, the present invention achieves the above and other objects in an apparatus for fluid catalytic cracking of a hydrocarbon feed, comprising: a riser conversion zone formed as an elongated tubular conduit having upstream and downstream ends; a conduit for introducing a suspension of hydrocarbon feed and catalyst into an upstream end of the riser conversion zone to produce a mixture of catalyst and cracked hydrocarbon feed exiting at a downstream end of the riser conversion zone; a separator, having an inlet disposed at the downstream end of the riser conversion zone, with the inlet having a direction of flow thereinto which is at an angle to the direction of flow of the suspension of hydrocarbon feed and catalyst preceding the separator inlet, said separator separating at least a portion of catalyst from gasiform hydrocarbon materials flowing into the separator inlet; and a catalyst conduit for passing catalyst, which fails to enter the separator inlet, to a dense bed catalyst storage area in the reactor vessel.

BRIEF DESCRIPTION OF THE DRAWINGS

A more complete appreciation of the invention, and many of the attendant advantages thereof, will be readily apparent as the same becomes better understood by reference to the accompanying drawings, wherein:

FIG. 6 is a perspective view of a fourth embodiment of the present invention, wherein horizontal plane separation is utilized;

FIG. 7 is a top view illustrating a portion of a dual cyclone/dual catalyst conduit assembly utilizing horizontal plane separation employed in the fourth embodiment of the invention; and FIG. 8 is a perspective view of a fifth embodiment of the present invention utilizing horizontal plane separation but with a cyclone separator supported from the reactor vessel.

DETAILED DESCRIPTION OF PREFERRED EMBODIMENTS

Figure 2:
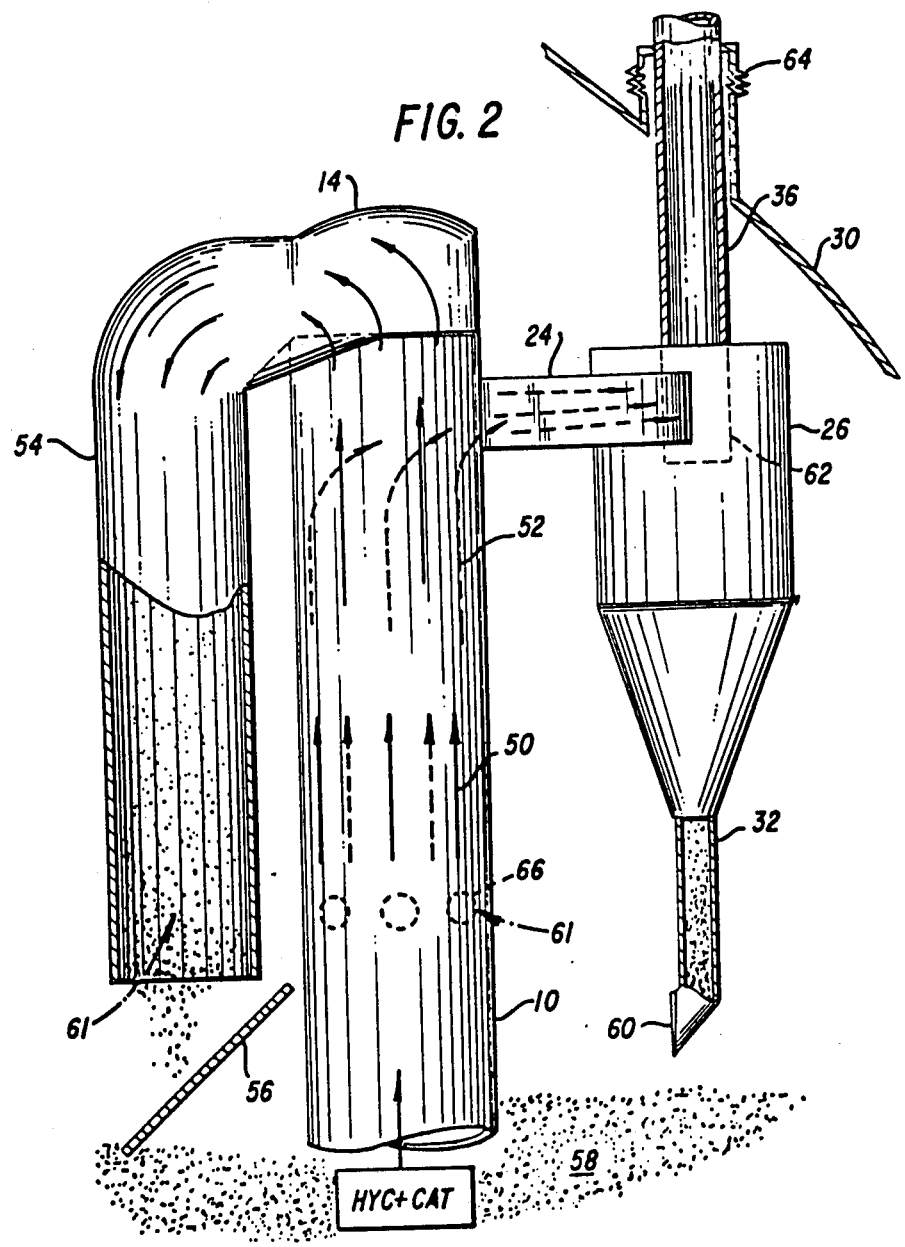
FIG. 2 is a side cross-sectional view of a first embodiment of the present invention utilizing vertical plane separation.

Referring now more particularly to the drawings, wherein like numerals represent like elements throughout the several views, FIG. 2 illustrates a portion of a 2 cyclone/2 catalyst conduit system modified with a vertical plane catalyst particle separation system. A hydrocarbon feed and catalyst mixture (HYC+CAT) travels vertically upward through a riser conversion zone located in the elongated tubular conduit of riser 10 and undergoes catalytic cracking, as is well known. At the upper portion of riser 10, the mixture of catalyst particles, represented by solid line arrows 50, and gasiform hydrocarbon materials, represented by dotted lines 52, travel in a direction adjacent a cyclone inlet 24 and towards an end cap 14 of the riser conversion zone at a velocity in the vicinity of 50-80 feet per second. A lower pressure in riser cyclone separator 26 allows the gasiform hydrocarbon materials to be drawn off from the vertically ascending hydrocarbon feed into inlet 24 of cyclone separator 26. It should be noted that the inlet 24 has a flow direction making an angle with respect to the mixture flow direction.

The inertial momentum of catalyst particles in the mixture causes them to continue vertically upward, until loss of momentum and/or collisions with end cap 14 and other particles causes the catalyst to fall into catalyst conduit 54. The majority of catalyst particles follow the route indicated by solid line arrows 52 and travel through the catalyst conduit 54, whereupon they strike deflector plate 56 and are distributed onto a dense bed catalyst storage area 58 contained in the lower portion of the reactor vessel. As in the prior art illustrated in FIG. 1, the dense bed catalyst storage area can include a catalyst stripper, with the addition of suitable baffles and the introduction of a suitable stripping gas, such as steam (not shown). Additional stripping can occur if the steam 61, introduced either at the lower end of catalyst conduit 54 or in the dense bed catalyst storage area 58, passes up through the lower end of catalyst conduit 54. This stripping steam, indicated by dot/dash arrow 61, would travel countercurrently up the catalyst conduit and into the inlet 24 of riser cyclone separator 26.

Because some small diameter catalyst particles will be carried along with the gasiform hydrocarbon materials into inlet 24, the cyclone separator is utilized to remove at least a portion of these particles prior to passage of the gaseous effluent out of the reactor vessel. Although prior art seperators have inlet and outlet velocities of from 50–70 feet per second (FPS), in the present invention, because most catalyst bypasses the cyclone inlet, entrance velocities to the riser cyclone separator 26 are on the order of from 90–120 feet per second, with gaseous effluent exhaust velocities on the order of from 90–220 feet per second. It is this higher velocity (due to reduced amounts of catalyst particles) which allows both a smaller separator dimension and a greater separator efficiency in accordance with the present invention. Catalyst particles which have been separated from the gasiform hydrocarbon materials in the riser cyclone separator 26 will settle into dipleg 32 and, when a sufficient column of particles gathers, the trickle valve 60 permits these particles to join those in the dense bed catalyst storage area 58. The base 62 of the cyclone exhaust 36 extends below the lowest most portion of the cyclone inlet 24, thus promoting the separation of catalyst particles entrained in the gasiform hydrocarbon materials entering the riser cyclone separator 26.

In the embodiment shown in FIG. 2, the riser cyclone separator 26 is supported on the riser 10, as is the catalyst conduit 54. During start-up, shut-down and normal operation of the system, substantial temperature differentials exist between the riser 10 and reactor vessel 30, creating thermal expansion differences between the two structures. These differences are accounted for in the FIG. 2 structure by a sealing means comprising expansion joint bellows seal 64, which forms a pressure tight junction between the reactor vessel 30 and cyclone effluent exhaust conduit 36, while still allowing relative movement therebetween.

Figure 3:
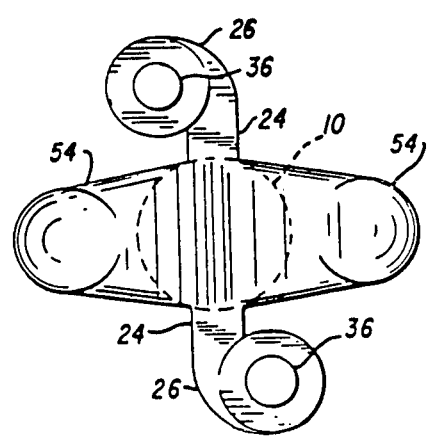
FIG. 3 is a top view of the first embodiment shown in FIG. 2.

FIG. 3 is a top view of one embodiment of the vertical separation closed cyclone system showing both cyclones and both catalyst conduits illustrated in FIG. 2, with one cyclone and one catalyst conduit omitted for clarity. Two riser cyclones 26 and two catalyst conduits 54 are connected to riser 10, resulting in an extremely compact structure located inside the reactor vessel 30. Obviously, any number of cyclones and/or catalyst conduits could be utilized, depending upon the flow requirements, the size of the reactor vessel, etc. In FIG. 2, there are also shown inlet apertures 66 which allow for the introduction of stripping steam 61 into the upper end of the riser conversion zone in the event a sufficient volume of stripping steam cannot be made to flow up the catalyst conduit 54 countercurrent to the catalyst flow direction. Again, this stripping steam 61 can be provided from a separate steam source or can be stripping steam which has traveled through the dense bed catalyst storage area 58, serving to strip hydrocarbon vapors therefrom during the process.

Figures 1, 4:
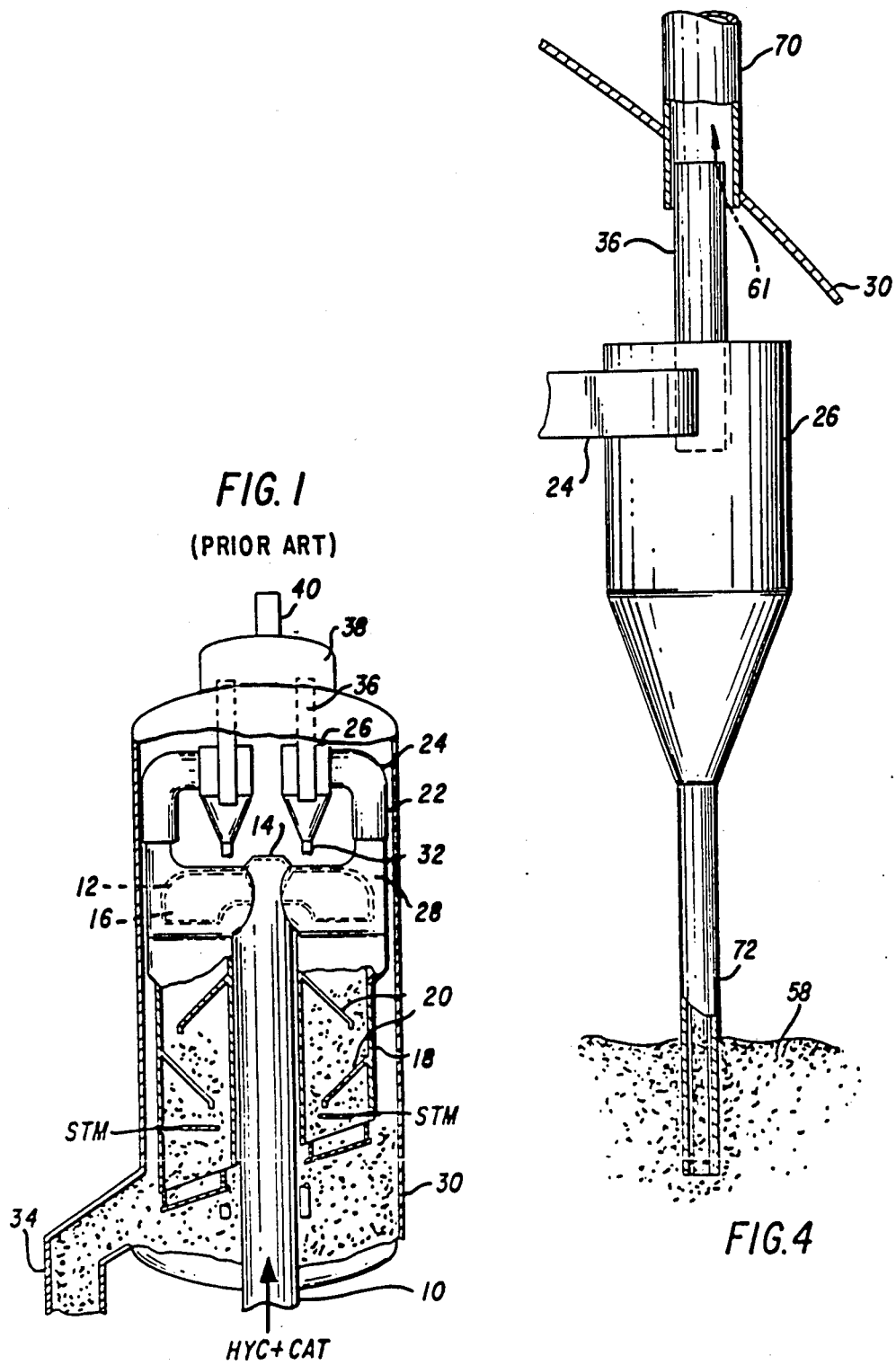
FIG. 1 is a cross-sectional view illustrating a prior art FCC closed cyclone system illustrated in FIG. 2 of U.S. Pat. No. 4,404,095 issued to Haddad et al.
FIG. 4 is a side cross-sectional view of a second embodiment of the invention illustrating a variation of the provision for thermal expansion when the cyclone separator is supported from the riser structure.

A different manner of accommodating the thermal expansion problem, where the cyclone separator 26 is mounted on the riser, is illustrated in FIG. 4, wherein the cyclone effluent exhaust conduit 36 is received into reactor vessel exhaust conduit 70 which is sealingly engaged with the reactor vessel 30. The cyclone effluent exhaust conduit 36 and reactor vessel exhaust conduit 70 overlap and define an annular space between each other, through which stripping steam 61 can pass from the dense bed catalyst storage area 58 in the event stripping is accomplished therein. The difference in expansion between the reactor vessel 30 and the riser and movement resulting therefrom is taken up by movement of the cyclone effluent exhaust conduit 36 in the reactor vessel exhaust conduit 70. However, because of the annular separation between the two, the pressure in the riser cyclone separator 26 must be higher than that in the reactor vessel. This higher pressure requirement of the FIG. 4 type thermal expansion system requires that the cyclone separator 26 have a dipleg extension 72 which extends downwardly into the dense bed catalyst storage 58, preventing catalyst in the lower portion of the cyclone from being blown out of the trickle valve 60, utilized in the FIG. 2 embodiment.

Figure 5:
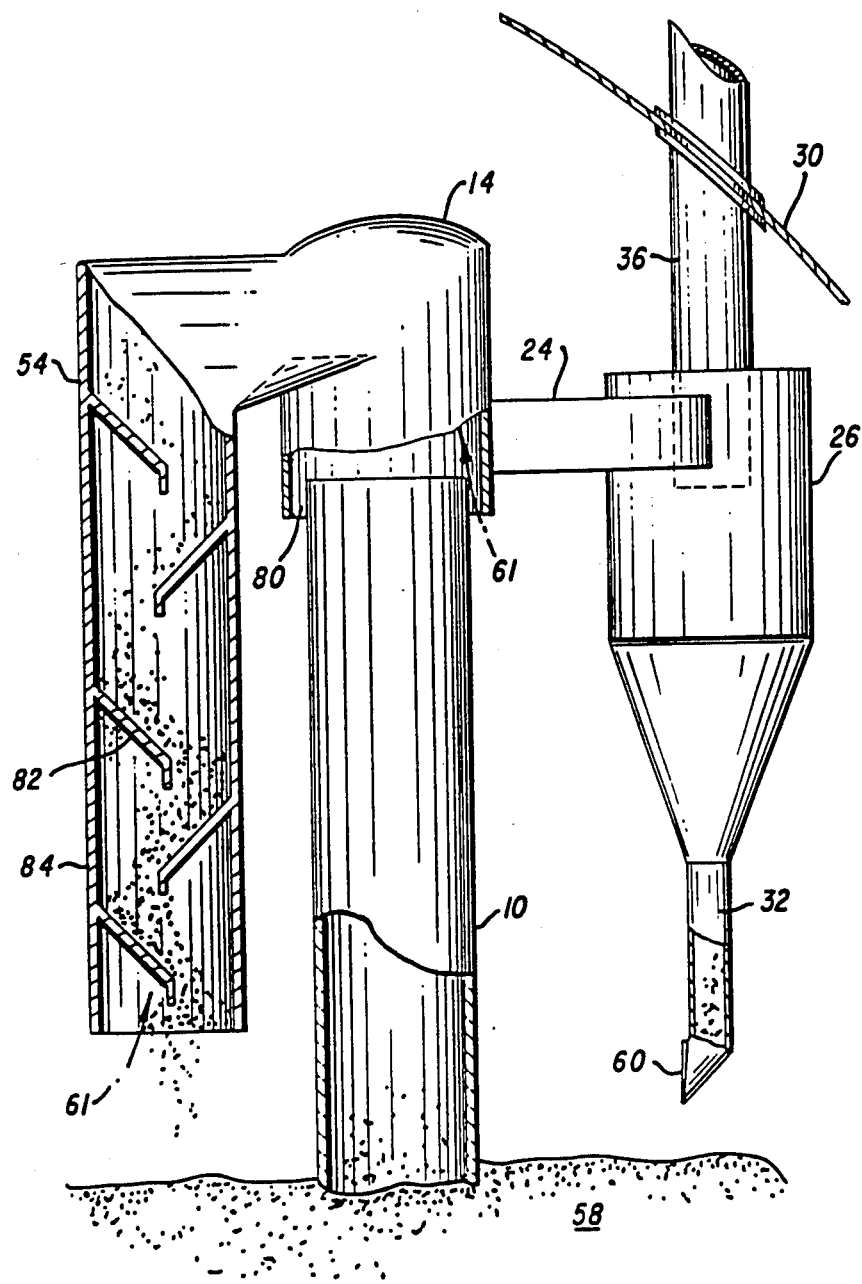
FIG. 5 is a side cross-sectional view of a third embodiment of the present invention, wherein vertical plane separation is employed and the cyclone separator is supported from the reactor vessel itself.

The cyclone separator and catalyst conduit may also be supported from the reactor vessel, as is shown in FIG. 5. The FIG. 5 operation is similar to that described with reference to FIG. 2, except that between the end of the riser 14 and the main riser portion 10 an annular gap 80 is created. Additionally, the cyclone effluent exhaust conduit 36 is fixably attached to the reactor vessel 30. Of course, there may be other supporting braces, etc., between the catalyst conduit 54, riser end cap 14 and/or riser cyclone separator 26 in order to support the structure from the reactor vessel 30. Thus, differences in expansion between the reactor vessel 30 and riser 10 are taken into account and the size of annular gap 80 is sufficient to accommodate these changes.

In the FIG. 5 embodiment, the lower portion of catalyst conduit 54 has been supplied with baffles 82 to form a dilute phase stripper 84. Stripping steam 61 may be supplied at the lower end of stripper 84, or may come from the dense bed catalyst storage area 58, and passes through perforations in baffles 82 in a direction opposite to the flow of catalyst down the stripper portion of catalyst conduit 54. Additionally, stripping steam 61 can enter the annular gap 80 for immediate contact with catalyst particles flowing past the opened upper portion of riser 10 before the stripping steam is drawn into cyclone inlet 24. As in FIG. 2, because the cyclone pressure is below that inside the reactor vessel, there is no need to have a dipleg extension 72 disposed in the dense bed catalyst storage area 58, and a simple trickle valve 60 on cyclone dipleg 32 is sufficient to maintain the catalyst seal on the cyclone separator.

It should be noted that in FIGS. 2–5, separation of catalyst particles and gasiform hydrocarbon materials occurs because of a flow direction change in the vertical plane, i.e., the catalyst particles, by means of inertial forces continue traveling upwardly, while the suction of cyclone intake inlet 24 causes the gasiform hydrocarbon materials to deviate 90°, in the preferred embodiments shown, to a horizontal direction. The vertical direction, in which catalyst particles continue traveling, and the horizontal direction, comprising the gasiform hydrocarbon material flow at the inlet 24 of the cyclone separator, are both located in a plane which is vertical, and these separators are considered to be vertical plane direction changing separators.

In some instances, it may be desirable to utilize horizontal plane separation and an example of such a separator is illustrated in FIG. 6. Riser 10 and end cap 14 are conventional in nature and operate in the same manner as in the previous systems. However, upon reaching the upper limit, the mixture of cracked hydrocarbon feed and catalyst turns 90° and begins traveling horizontally towards catalyst conduit 54. The catalyst particles, by way of inertia, continue traveling into and down catalyst conduit 54, as has been previously discussed. However, the riser cyclone separator 26 has an inlet 24, which has a flow direction at a substantial angle (90° in a preferred embodiment) with respect to the hydrocarbon feed and catalyst flow direction into catalyst conduit 54. Accordingly, although catalyst particles, by way of inertial forces, continue past the inlet 24, the gasiform hydrocarbon materials flow into the inlet 24 of riser cyclone separator 26, wherein any entrained catalyst particles are separated and passed down dipleg 32 through trickle valve 60 and into the dense bed catalyst storage area 58 below. As before, the hydrocarbon gaseous effluent will pass up through cyclone effluent exhaust conduit 36 and either pass to additional separators or directly to a quenching and/or fractionation station. The flow direction change can be seen in FIG. 7, which is a top view showing separation in the horizontal plane, with catalyst particle flow being illustrated by solid line arrows 50 and gasiform hydrocarbon materials flow being illustrated by dotted line arrows 52. As in the embodiment in FIG. 2, the riser cyclone separator 26 and the catalyst conduit 54 are supported by riser 10, and thus differences in thermal expansion between the riser and the reactor vessel 30 are accommodated by expansion joint bellows seal 64.

As in FIG. 2, it may be desirable to add stripping steam by means of insertion into apertures 66 or up through catalyst conduit 54. Differences in thermal expansion could also be accommodated by means of the structure shown with reference to FIG. 4, in which a reactor vessel exhaust conduit is received into the reactor vessel 30 and defines an annular space around the cyclone effluent exhaust conduit 36. Of course, this device requires that the cyclone separator pressure be slightly greater than the reactor vessel pressure, and necessitates a dipleg extension 72 extending into the dense bed catalyst storage area 58, as shown in FIG. 4.

Although in FIGS. 6 and 7 a horizontal separation system supported from the riser is illustrated, the separator could also be supported from the reactor vessel, in the manner of previously discussed FIG. 5, but with horizontal instead of vertical separation. An example of this is illustrated in FIG. 8, in which the complete cyclone system is supported from the reactor vessel 30, with the catalyst conduit 54 being supported from the riser 10. To accommodate differences in thermal expansion, the cyclone inlet 24 is not physically connected to catalyst conduit 54, and instead is disposed immediately adjacent aperture 90 in the catalyst conduit wall. Thus, differences in thermal expansion are taken into account by virtue of the separation between the structures and, because of the close proximity of cyclone inlet 24 to aperture 90, the beneficial aspects of a "closed cyclone" system are maintained since virtually all vapor in the vicinity of inlet 24 is sucked into the riser cyclone separator 26. In fact, in this embodiment, stripping steam, either independently supplied or traveling up through the dense bed catalyst storage area 58 (not shown), could travel into inlet 24, accomplishing further immediate catalyst stripping, with the stripped hydrocarbons traveling up cyclone effluent exhaust conduit 36 and the catalyst particles traveling down through dipleg 32 and out trickle valve 60.

Thus, providing either vertical or horizontal separation between catalyst particle flow and gasiform hydrocarbon materials can reduce the mass rate of flow into the riser cyclone separator, reducing its size requirements and allowing a more compact separator system. Additionally, without the large volume of catalyst particles passing into the cyclone separator, flow velocities can be increased substantially, resulting in an even smaller size and greater efficiencies for a given hydrocarbon mass flowrate through the cyclone separator. Stripping gas may be supplied as a by-product of a dense bed catalyst stripper located below the catalyst conduit and the cyclone trickle valve, or may be independently supplied to the catalyst conduit (as seen in FIGS. 2 and 6), to the riser (as shown in FIGS. 2, 5 and 6), to the inlet of the riser cyclone separator (as shown in FIG. 8), and/or to the effluent exhaust outlet of the cyclone separator (as shown in FIG. 4). Baffles may be added to the catalyst conduit, which baffles may include perforations to facilitate the passage of stripping steam therethrough during the operation of a dilute phase stripper, as illustrated in FIG. 5.

As can be appreciated from the above description and the accompanying figures, many modifications and changes can be made to the present invention without departing from its spirit or scope. Although the present invention has been described relative to a number of specific embodiments thereof, it is not so limited, and many other modifications and variations will be readily apparent. It is, therefore, to be understood that within the scope of the appended claims the invention may be practiced otherwise than as specifically described.

The embodiments of the invention in which an exclusive property or privilege is claimed are defined as follows:

1. An apparatus for fluid catalytic cracking of a hydrocarbon feed, comprising:
   a reactor vessel comprising a riser conversion zone formed as a vertically disposed elongated tubular conduit having an upstream end and a downstream end, said downstream end terminating within said reactor vessel;
   means for introducing a suspension of hydrocarbon feed and catalyst into an upstream end of said riser conversion zone to produce a mixture of catalyst and cracked hydrocarbon feed traveling in an upward direction of flow towards the downstream end of said riser conversion zone;
   catalyst conduit means, said catalyst conduit means comprising a horizontal portion for communicating with said downstream end of said conversion zone and for conveying said mixture in a first direction, and a vertical portion for subsequently conveying said mixture downwardly to a catalyst storage area within said reactor vessel, said catalyst conduit horizontal portion merging with said catalyst conduit vertical portion and being in communication with said catalyst conduit vertical portion;
   a riser cyclone separator means, having an inlet disposed adjacent said horizontal portion of said catalyst conduit means, an effluent exhaust and a catalyst exhaust, said inlet having an inlet flow direction and being in fluid communication with said catalyst conduit means, said mixture direction and said inlet flow direction lying in a substantially horizontal plane;
   conduit means for conducting said separator means effluent exhaust out of said reactor vessel; and
   a dipleg for conveying said separator catalyst from said cyclone catalyst exhaust to said catalyst storage area.

2. The apparatus according to claim 1, wherein said elongated tubular conduit includes means for supporting said catalyst conduit means, wherein said apparatus further includes means for mounting said riser cyclone separator means from said reactor vessel with said separator means effluent exhaust conduit passing through and in sealing engagement with said reactor vessel, said riser cyclone separator means inlet being disposed adjacent a catalyst conduit aperture, such that a fluid communication exists between said aperture and said separator inlet while permitting movement between said separator means and said catalyst conduit means.

3. The apparatus according to claim 1, further comprising means for stripping hydrocarbons from said catalyst in said catalyst storage area, wherein a longitudinal axis of said cyclone inlet intersects a longitudinal axis of said horizontal portion of said catalyst conduit.

4. The apparatus according to claim 1, wherein said catalyst conduit includes dilute phase stripper means for passing stripping steam countercurrently with respect to catalyst traveling through said catalyst conduit and then into said cyclone inlet.

5. The apparatus according to claim 1, wherein said riser conversion zone includes means for injecting steam into said suspension of hydrocarbon feed and catalyst traveling through said riser conversion zone.

6. The apparatus according to claim 1, wherein said elongated tubular conduit of said riser conversion zone comprises means for supporting said catalyst conduit means and said riser cyclone separator means.

* * * * *